United States Patent
Peiker

(10) Patent No.: US 6,775,561 B1
(45) Date of Patent: Aug. 10, 2004

(54) HOLDER FOR RADIO TELEPHONE

(76) Inventor: Andreas Peiker, Max-Planck-Strasse 32, 61381 Friedrichsdorf (DE)

(*) Notice: Subject to any disclaimer, the term of this patent is extended or adjusted under 35 U.S.C. 154(b) by 507 days.

(21) Appl. No.: 09/691,192

(22) Filed: Oct. 19, 2000

(30) Foreign Application Priority Data

Oct. 21, 1999 (DE) .......................... 199 50 929

(51) Int. Cl.[7] .............................. H04B 1/38
(52) U.S. Cl. .................. 455/569.1; 455/575.9
(58) Field of Search ............... 455/569.1, 569.2, 455/575.1, 575.9; 379/446, 455

(56) References Cited

U.S. PATENT DOCUMENTS

| 5,121,863 | A | | 6/1992 | Kotitalo et al. | |
|---|---|---|---|---|---|
| 5,463,688 | A | | 10/1995 | Wijas | |
| 5,652,792 | A | * | 7/1997 | Gallagher et al. | .......... 379/446 |
| 5,907,796 | A | | 5/1999 | Matchett et al. | |
| 6,229,893 | B1 | * | 5/2001 | Chen | .......... 379/446 |

FOREIGN PATENT DOCUMENTS

| DE | 298 21 166 | 2/1999 |
|---|---|---|
| DE | 299 02 507 | 6/1999 |
| JP | 07135521 | 5/1995 |
| JP | 11040254 | 2/1999 |
| WO | 98/40244 | 9/1998 |

* cited by examiner

Primary Examiner—Lee Nguyen
(74) Attorney, Agent, or Firm—Morgan Lewis & Bockius LLP

(57) ABSTRACT

An apparatus for holding and making contact with a radio telephone. Provision is made here to develop an apparatus which only allows contact to be made between the interface of the radio telephone (201) and the contact-making unit arranged in the holder (200) when these are in optimum alignment with one another.

11 Claims, 3 Drawing Sheets

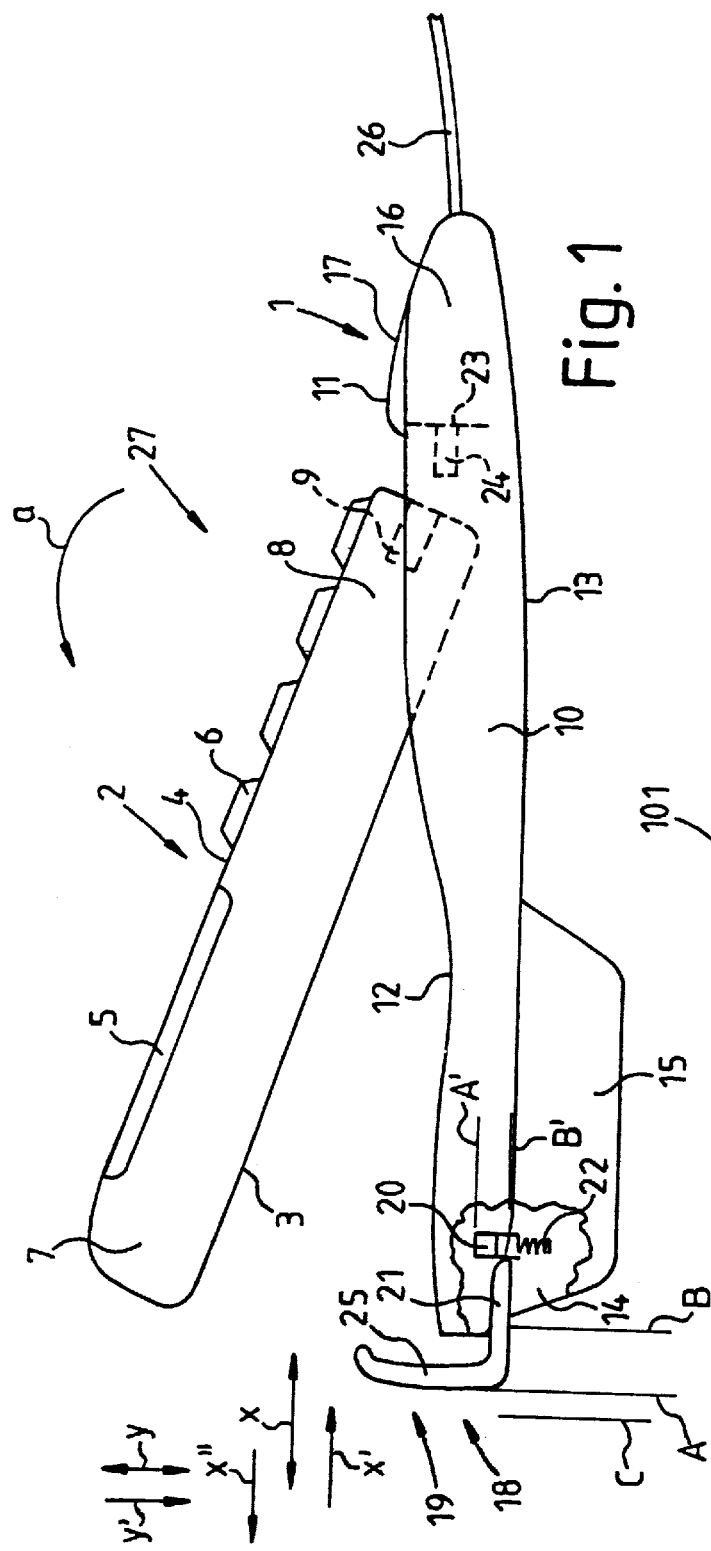
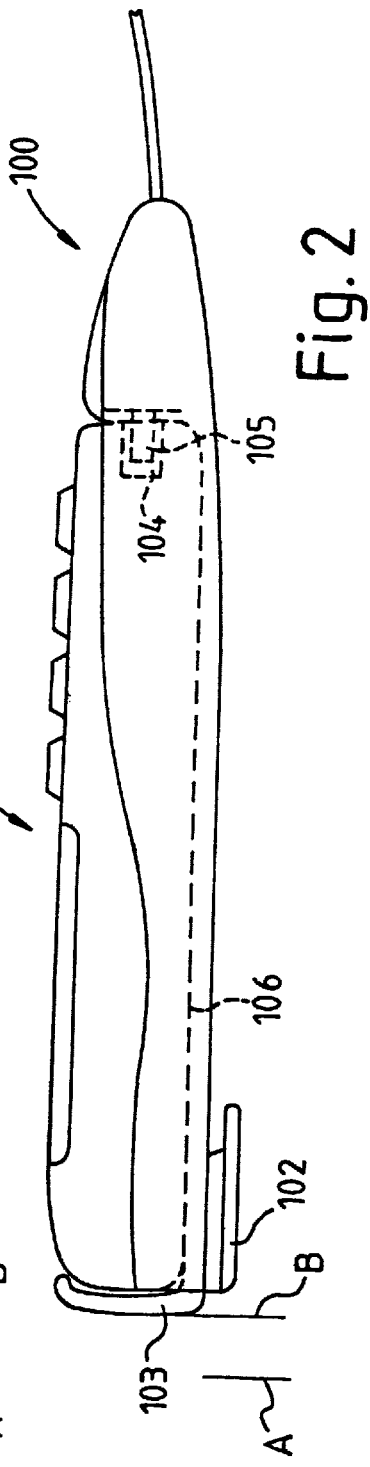
Fig. 1
Fig. 2

HOLDER FOR RADIO TELEPHONE

BACKGROUND OF THE INVENTION

1. Field of the Invention

The present invention relates to an apparatus for holding and making contact with radio telephone.

Such apparatuses are used in vehicles in order for a radio telephone to be retained securely and to be connected electrically to components installed in the vehicle, for example hands-free talking facility, antenna and power supply.

2. Discussion of the Related Art

The prior art discloses an apparatus in which the holder has a slide which is spring-prestressed in the direction of the contact-making unit. For insertion purposes, the radio telephone is positioned obliquely against the slide by way of the region which is directed away from the interface of the radio telephone. The slide is then pushed back counter to the spring force of the slide and the radio telephone is pivoted into the accommodating region of the holder. As soon as the user lets go of the radio telephone, the latter is pushed by the slide in the direction of the contact-making unit and coupling takes place between the radio-telephone interface and contact-making unit.

In a further apparatus known from the prior art, a slide is held back by a spring, with the result that the radio telephone can first of all be inserted into the shell of the holder. Contact is made between the interface and the contact-making unit by the radio telephone being pushed onto the contact-making unit with the aid of the slide, which latches in the operating position.

As far as careful contact being made between the sensitive interface of the radio telephone and the likewise sensitive contact-making unit provided on the holder, the known holders are in need of improvement. This is because, in the case of the known holders, it is not ensured that contact is only made when the radio telephone is aligned with the holder and/or the contact-making unit such that contact is made without tilting and thus damage. Centering of the radio telephone in relation to the contact-making unit of the holder is not possible, in modern radio telephones, with the aid of a grip-over slide since the entire top side of the radio telephone is covered by buttons and display devices, with the result that a grip-over slide would cover these over.

SUMMARY OF THE INVENTION

The object of the invention is to develop an apparatus which is intended for holding and making contact with a radio telephone and only allows contact to be made between the interface of the radio telephone and the contact-making unit arranged in the holder when these are in optimum alignment with one another.

The apparatus according to the invention for holding and making contact with a radio telephone makes provision for a contact-making unit and/or a retaining means to be kept in an open position by at least one restraining means. In this case, a switching means which is actuated by the rear part of the radio telephone upon contact with the shell of the holder releases the contact-making unit and/or the retaining means. This ensures that contact is only made when the radio telephone is located in its entirety in the shell of the holder. In this position, the interface and the contact-making unit are in alignment with one another.

In another aspect of the subject matter of the invention, the retaining means is guided linearly on the holder and is displayed by spring force from the open position, towards the contact-making unit or the tubular element, into an operating position. In this case, the radio telephone, configured as a mobile, is displaced towards contact-making unit. This advantageous since, in this embodiment, the contact-making unit is arranged in the holder as a fixed, non-moveable unit, and the connection wires leading to it are thus not subjected to constant movement.

An exemplary embodiment of the subject matter of the invention makes provision for the retaining means to be forced in at least one displacement direction by a spring. This allows careful contact to be made.

According to an exemplary embodiment of the subject matter of the invention, of contact-making unit mounted on the holder in linearly displaceable manner and can be displaced from the open position, towards the retaining means and/or the radio telephone, into an operation position, This linear movement of the contacts towards one another ensures that said contacts are guided one inside the other without lateral loading.

If the contact-making unit is forced in at least one displacement direction by a spring, careful, automatic contact can be made.

If the restraining means is designed as a resilient push rod which projects from the shell of the holder and is arranged in the displacement region of the contact-making unit and/or of the retaining means, then it is possible, with low structural, for the contact-making unit/or retaining means to be kept in an open position, in which the radio telephone can be inserted.

If the push rod can be pushed down by the rear part of the radio telephone, the push rod can be operated by the radio telephone without the latter being adapted specifically to it.

According to an exemplary embodiment, the push rod can be drawn back by a lever which the radio telephone, configured as a mobile phone, actuates by way of the rear part when it is in the inserted state. This design makes it possible for the critical contact point between the radio telephone and the shell of the holder to be arranged at any desired location, or at a number of locations, of the shell and thus to take account of individual conditions, for example particular radio-telephone shapes.

Finally, a further refinement of the subject matter of the invention makes provision for a proximity switch to be arranged in the holder, it being possible for said switch to be actuated by the inserted radio telephone, the proximity switch activating an electromagnet which draws back the push rod. This measure makes it possible to achieve a pleasing surface configuration which conceals the function from view.

BRIEF DESCRIPTION OF THE DRAWINGS

In the figures:

FIG. 1 shows a side view of a holder in which the slide is located in a position in which it releases a radio telephone, FIG. 2 shows a side view of the second holder, in which the slide is located in a position in which it retains a second radio telephone.

DETAILED DESCRIPTION OF THE PREFERRED EMBODIMENTS

Figure 3:
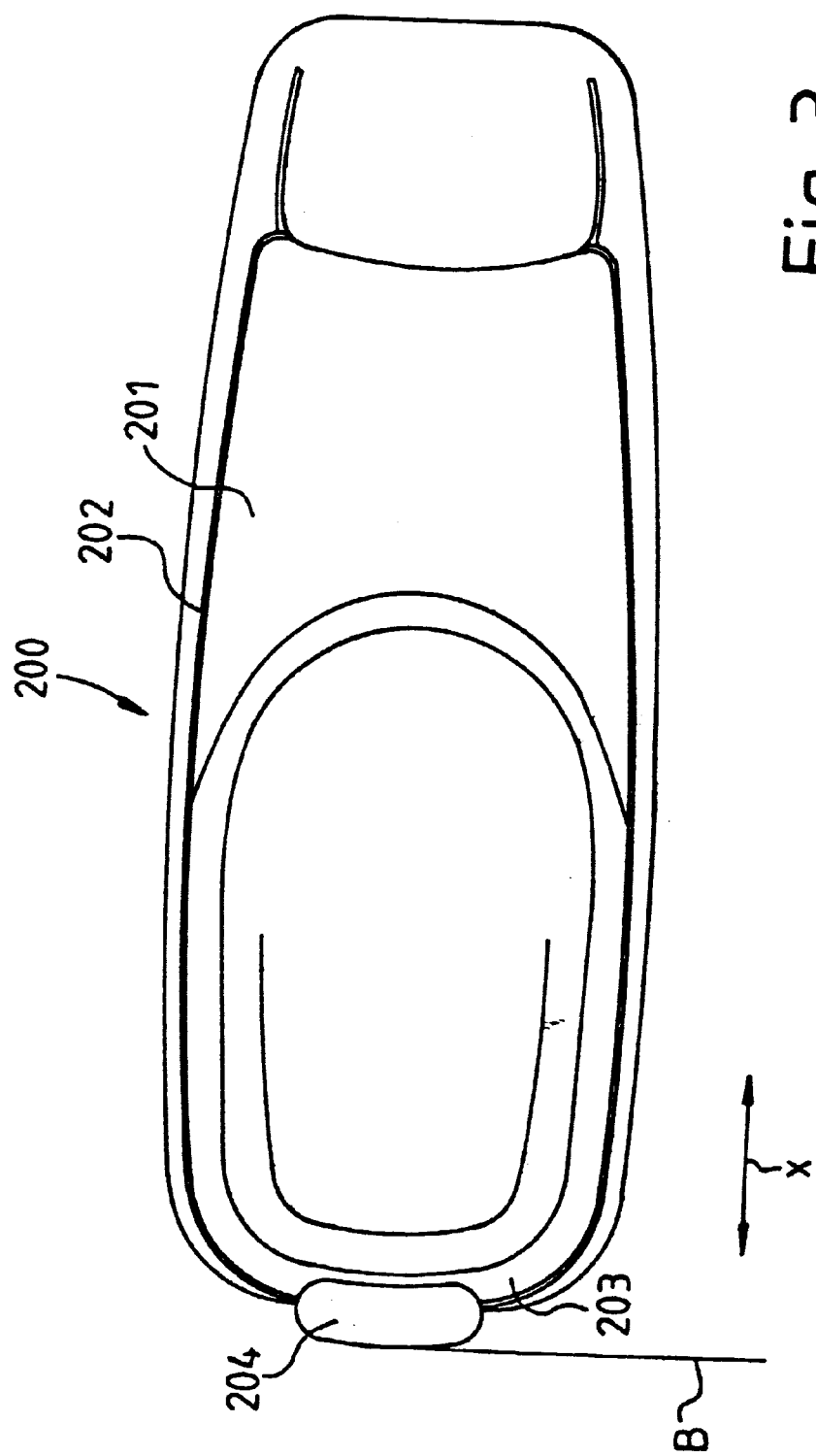
FIG. 3 shows a plan view of a third holder with radio telephone inserted.

FIG. 1 shows a holder 1 and a radio telephone 2. The radio telephone 2 has a rear side 3, a top side 4 with a display 5 and keypad 6, as well as a head region 7 and a foot region 8. An interface 9 is arranged in the foot region 8 of the radio telephone 2. The interface 9 has contact surfaces and/or contact pins (not illustrated). The holder comprises a basic body 10 which has a recess 12 on a top side 11. The holder 1 also has, on an underside 13, an earpiece region 15 in an end region 14 and a mouthpiece region 17 in an end region 16. A slide 18, which is designed as a clasp 19, is arranged in the end region 14. The clasp 19 is mounted in the holder 1 such that it can be displaced in double-arrow direction x. A spring device (not illustrated) forces the clasp 19 in arrow direction x' from an open position A into an operating position B. A movement of the clasp 19 in arrow direction x' is prevented by a push rod 20 which is arranged in the holder and against which a leg 21 of the clasp 19 butts in the open position A. The push rod 20 can be moved in double-arrow direction y' and can be pushed down counter to a spring 22, in arrow direction y', from a blocking position A' into a release position B'. In the end region 16, the recess 12 terminates in a wall 23 which bears a contact-making unit 24 (illustrated by dashed lines). The contact-making unit 24 comprises resilient contact pins and/or sleeve-like or fork-like master contacts (not illustrated). The radio telephone 2 is inserted into the holder 1, then, by the following steps. The radio telephone 2 is positioned obliquely in the recess 12 with the foot region 8 in the end region 16 of the holder 1, the rear side 3 of the radio telephone 2 being oriented in the direction of the recess 12 (this position is illustrated in FIG. 1). Thereafter, the radio telephone 2 is rotated in arrow direction a, the head region 7 of the radio telephone 2 being rotated in the direction of the end region 14 of the holder 1. As the radio telephone 2 is rotated into the mount 12, it comes into contact with the push rod 20 by way of the rear side 3 and pushes said push-rod counter to the spring 22, in arrow direction y", into the release position B'. In the release position B', the push rod 20 releases the clasp 19 and, on account of the spring prestressing in arrow direction x', said clasp moves into the operating position B. In this case, the clasp 19 pushes the radio telephone 2 in arrow direction x' by way of a second leg 25. This causes the interface 9 to slide onto the contact-making unit 24. The clasp 19 moves approximately parallel to the alignment of the contact pins (not illustrated) of the interface 9 and/or the contact-making unit 24. As soon as the radio telephone 2 has been inserted, it is then possible to make a telephone call via a hands-free talking facility (not illustrated) which is connected to the holder 1 via a data line 26. Furthermore, it is also possible to use the holder 1 as a handset 27 and to communicate with third parties via the earpiece region 15 and the mouthpiece region 17. The radio telephone 2 is removed from the holder 1 by the radio telephone 2 being drawn back in arrow direction x". In this case, the clasp 19 is carried along by the head region 7 of the radio telephone 2, in arrow direction x", into the open position A. In this position, as the radio telephone 2 is raised, the push rod 20 springs out of the release position B' into the blocking position A' since it is not held back either by the rear side 3 of the radio telephone 2 or by the leg 21 of the clasp 19. The illustration does not show that the push rod 20 is beveled in the direction of the leg 21, with the result that the clasp 19 is also released when the push rod 20 is not pushed out of the movement region of the clasp 19 to the full extent by the rear side of the radio telephone 2. In order to facilitate the removal of the radio telephone 2, provision is made for it to be possible for the clasp 19, as the radio telephone 2 is removed, to be pushed temporarily, by the head region 7 of said telephone, into a release position C, which is located behind the open position A.

FIG. 2 shows a further holder 100, into which a radio telephone 101 has been inserted. Instead of an, earpiece region and a mouthpiece region, said holder 100 has a shoe 102 by means of which the holder 100 can be pushed into a mount (not illustrated). In FIG. 2, a clasp 103 is located in an operating position B, in which the radio telephone 101 has been pushed onto a contact-making unit 105 of the holder 100 by way of an interface 104. Analogously to the holder 1, which is illustrated in FIG. 1, the holder 100 also has a blocking mechanism (not illustrated) which keeps the clasp 103 in an open position A and is released by a rear side 106 of the radio telephone 101 as the latter is inserted. According to a variant which is not illustrated, provision is made for the shoe 102 to be designed as a pole shoe, the latter being accommodated by a mount with contacts. In this case, the contacts which serve for connecting a hands-free talking facility, antenna, power supply and data supply are routed via the pole shoe.

FIG. 3 illustrates a plan view of a holder 200. A radio telephone 201 is accommodated in the holder 200. The radio telephone 201 is located in a recess 202 of the holder 200. The radio telephone 201 has a top side 203 over which a clasp 204, which is guided on the holder 200 in the direction of the movement arrow x, grips. The clasp 204 is located in an operating position B, in which the radio telephone 201 is in contact, via an interface (not illustrated), with a contact-making unit (not illustrated) of the holder 200.

Figure 4:
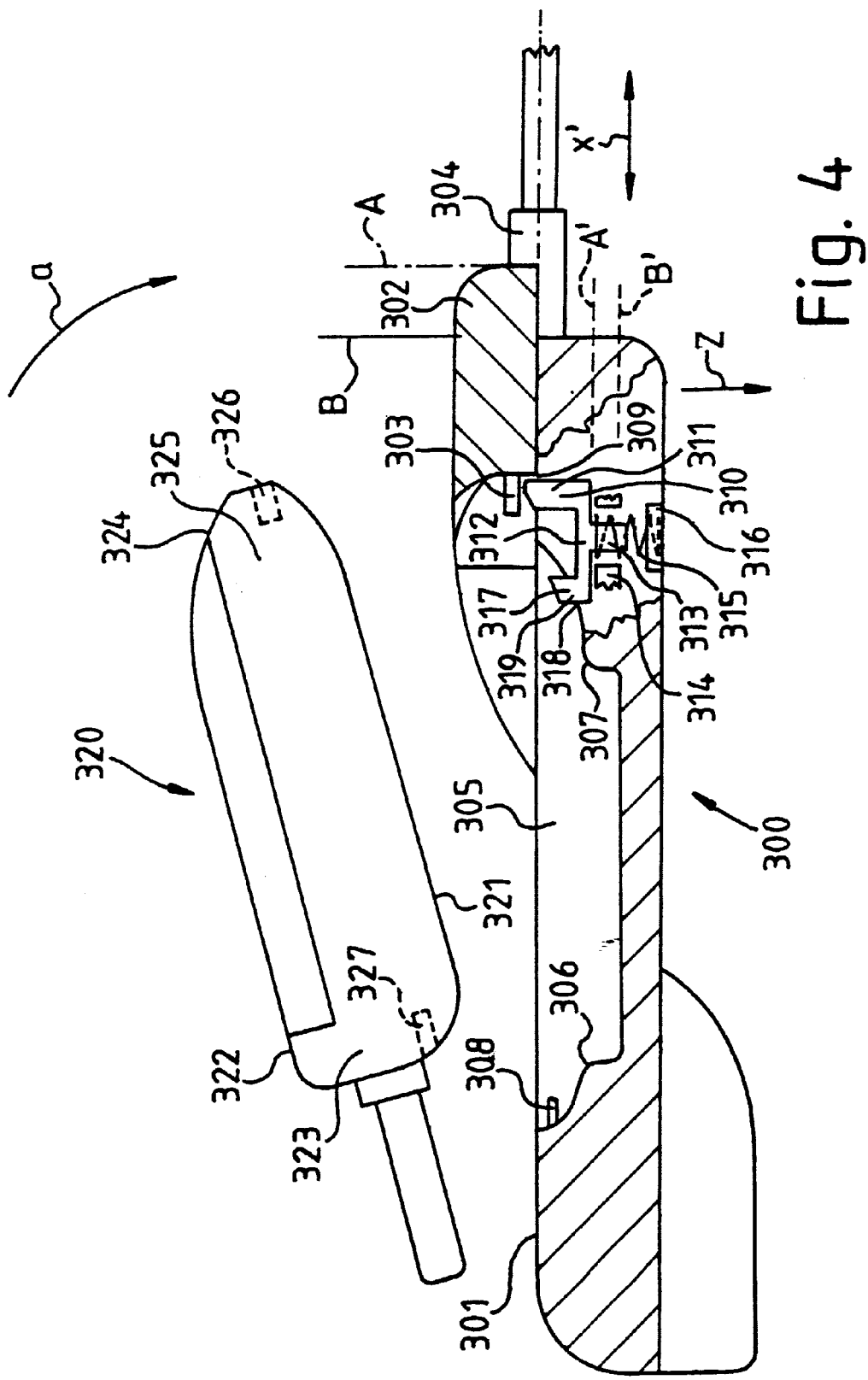
FIG. 4 shows a fourth radio telephone and a fourth holder, in which the slide is located in a position in which it releases the radio telephone.

FIG. 4 illustrates a sectional side view of a holder 300. A slide 302 with a contact-making unit 303 is mounted in a linearly moveable manner on a top side 301 of the holder 300. The contact-making unit 303 is connected electrically to a cable supply 304. The holder 300 has a hollow 305 on its top side 301. Said hollow 305 has shoulders 306, 307. The hollow 305 also has a tab 308 located opposite the slide 302. According to a variant which is not illustrated, the tab 308 is designed as a grip-over means. On the top side 301, a bore 309 is arranged in the holder 300 and has a push rod 310 engaging through it, said push rod being designed as a point 311 of a fork 312. The fork 312 has a shank 313 which is guided in a guide 314 against a spring 315. The spring 315 is supported at the other end in a mount 316. Furthermore, a second push rod 312 comes into contact with the shoulder 317 through a bore 318, said push rod being designed as a second point 319 of the fork 312. If the push rod 317 is pushed down, this causes the push rod 310 to be drawn back and thus the slide 302 to be released in a displacement direction x'. A radio telephone 320 is also illustrated in side view. The radio telephone 320 has a rear side 321. In the region of an earpiece 322, the radio telephone 320 forms a head region 323. In the region of a mouthpiece 324, the radio telephone 320 forms a foot region 325. An interface 326 is formed in the foot region 325. The radio telephone 320 also has a cavity 327 in the head region 323. Before the radio telephone 320 is inserted into the shell 305 of the holder 300, the fork 312 is located in a blocking position A'. As the radio telephone 320 is inserted into the shell 305 of the holder 300, the following sequence then takes place. The radio telephone 320 is moved towards the tab 308 with the head region 323 in a slightly oblique position. In this case, the cavity 327 accommodates the tab 308 with play. The radio telephone 320 is then rotated in the direction of an arrow a until the radio telephone 320 rests in the hollow 305, on the shoulders

306, 307, by way of its rear side 321. In this case, the push rod 317 is pushed into the holder 300 by the rear side 321 of the radio telephone 320. This causes the fork 312 to be pushed back counter to the spring 315 in an arrow direction Z. By virtue of this yielding movement of the fork 312, the push rod 310 is drawn back into the holder 300 and releases the slide 302 for a movement in arrow direction x'. The slide 302 is pushed in direction x' by a spring means (not illustrated). During this movement in arrow direction x', contact is made between the contact-making unit 303 provided on the slide 302 and the interface 326 arranged on the radio telephone 320. In the operating position B, full contact has been made between the interface 326 of the radio telephone 320 and the contact-making unit 303 of the slide 302. As long as the radio telephone 320 is located in the shell 305 of the holder 300 and/or the slide 302 is located in the operating position P (not illustrated), the fork 312 remains in a pushed-down, release position B'. The fork 312 only returns into the blocking position A' when the slide 302 is drawn back and the radio telephone 320 is removed from the shell 305 of the holder 300.

The invention is not restricted to exemplary embodiments illustrated or described. Rather, it also comprises developments of the invention within the scope of the appended claims and the their equivalents. In particular, the invention also provides a latching means for the clasp or the slide in the operating position B. According to a variant which is not illustrated, this is designed such that the clasp or the slide has hollows in which a ball which is mounted resiliently on the holder engages with snap action. This latching can be released by virtue of the pushing force being released

What is claimed is:

1. Apparatus for holding and making contact with a radio telephone, comprising:
    a retainer;
    a contact-making unit;
    at least one restraining means for keeping one of the retainer and the contact making unit in an open position and for releasing one of the retainer and the contact-making unit when a rear part the radio telephone actuates a switching means arranged in a shell of the holder.

2. Apparatus according to claim 1, wherein the retainer can be displaced linearly on the holder from the open position, towards the contact-making unit or an abutment, into an operating position.

3. Apparatus according to claim 2, wherein the retainer is forced in at least one displacement direction by a spring.

4. Apparatus according to claim 1, wherein the contact-making unit can be displaced linearly on the holder from the open position, towards the retaining means, into an operating position.

5. Apparatus according to claim 4, wherein the contact-making unit is forced in at least one displacement direction by a spring.

6. Apparatus according to claim 1, wherein the retainer comprises a resilient push rod which is arranged in the displacement region of the contact-making unit and of the retaining means.

7. Apparatus according to claim 6, wherein the push rod can be pushed down by the rear part of the radio telephone.

8. Apparatus according to claim 6, wherein the push rod can be drawn back by a lever which the radio telephone actuates by way of the rear part when it is in the inserted state.

9. Apparatus according to claim 6, wherein at least one proximity switch arranged in the holder can be actuated by the inserted radio telephone, the proximity switch activating an electromagnet which draws back the push rod.

10. Apparatus for holding and making contact with a radio telephone, comprising:
    a retainer;
    a contact-making unit;
    at least one restraining means for keeping the retainer in an open position and for releasing the retainer when a rear part of the radio telephone actuates the restraining means, the restraining means being arranged in a shell of the holder.

11. Apparatus for holding and making contact with a radio telephone, comprising:
    a retainer;
    a contact-making unit;
    at least one restraining means for keeping the contact making unit in an open position and for releasing the contact-making unit when a rear part of the radio telephone actuates the restraining means, the restraining means being arranged in a shell of the holder.

* * * * *